(12) United States Patent
Weber et al.

(10) Patent No.: US 10,895,416 B2
(45) Date of Patent: Jan. 19, 2021

(54) HOUSEHOLD REFRIGERATION APPLIANCE WITH INTERIOR LIGHTING AND METHOD FOR PRODUCING THE HOUSEHOLD REFRIGERATION APPLIANCE

(71) Applicant: BSH HAUSGERAETE GMBH, Munich (DE)

(72) Inventors: Armin Weber, Lauchheim (DE); Tobias Mayr, Bachhagel (DE); Andreas Hirschbolz, Syrgenstein (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/385,704

(22) Filed: Apr. 16, 2019

(65) Prior Publication Data

US 2019/0316837 A1    Oct. 17, 2019

(30) Foreign Application Priority Data

Apr. 16, 2018 (DE) .................... 10 2018 205 757

(51) Int. Cl.
| | |
|---|---|
| *F25D 27/00* | (2006.01) |
| *F21V 8/00* | (2006.01) |
| *F21V 33/00* | (2006.01) |
| *F21W 131/305* | (2006.01) |

(52) U.S. Cl.
CPC .......... *F25D 27/00* (2013.01); *F21V 33/0044* (2013.01); *G02B 6/005* (2013.01); *G02B 6/009* (2013.01); *G02B 6/0065* (2013.01); *G02B 6/0073* (2013.01); *G02B 6/0083* (2013.01); *G02B 6/0088* (2013.01); *F21W 2131/305* (2013.01)

(58) Field of Classification Search
CPC ............. F25D 27/00; G02F 1/133615; F21W 2131/405; F21S 8/024; F21V 2200/20
USPC ................................ 312/223.5; 362/600–634
See application file for complete search history.

(56) References Cited

U.S. PATENT DOCUMENTS

| | | |
|---|---|---|
| 7,736,010 B2 | 6/2010 | Lee |
| 8,393,746 B2 * | 3/2013 | Lee .................... F25D 27/00 362/249.02 |

(Continued)

FOREIGN PATENT DOCUMENTS

DE    102014209141 A1    11/2015

*Primary Examiner* — Rajarshi Chakraborty
*Assistant Examiner* — Michael Chiang
(74) *Attorney, Agent, or Firm* — Laurence A. Greenberg; Werner H. Stemer; Ralph E. Locher

(57) ABSTRACT

A household refrigeration appliance has a heat-insulated body with an inner container, which delimits a coolable interior provided for storing foodstuffs, a refrigeration device for cooling the coolable interior, a door leaf for closing the coolable interior and interior lighting for the at least partial illumination of the coolable interior. The coolable interior is defined by two side walls and one rear wall of which the surfaces facing the coolable interior are formed by the inner container. The interior lighting has an at least semitransparent cover, a planar light guide with a first surface facing the inner container and a second surface facing the cover and at least one lighting device, which couples its light into the planar light guide so that the planar light guide is able to decouple the light from its second surface.

15 Claims, 5 Drawing Sheets

(56) References Cited

U.S. PATENT DOCUMENTS

| | | | | |
|---|---|---|---|---|
| 2007/0266723 A1* | 11/2007 | Lee | ............ | F25D 27/00 |
| | | | | 62/264 |
| 2009/0052161 A1* | 2/2009 | Lee | ............ | F25D 27/00 |
| | | | | 362/94 |
| 2010/0053934 A1* | 3/2010 | Yoon | ............ | F25D 27/00 |
| | | | | 362/92 |
| 2010/0170279 A1* | 7/2010 | Aoki | ............ | F25D 11/02 |
| | | | | 62/264 |
| 2012/0106129 A1* | 5/2012 | Glovatsky | ............ | F25D 27/00 |
| | | | | 362/92 |
| 2013/0182412 A1* | 7/2013 | Choi | ............ | G02F 1/133615 |
| | | | | 362/97.1 |
| 2014/0043560 A1* | 2/2014 | Jang | ............ | H05K 5/02 |
| | | | | 349/58 |
| 2014/0098564 A1* | 4/2014 | Magnan | ............ | F21S 8/04 |
| | | | | 362/606 |
| 2016/0341887 A1* | 11/2016 | Fang | ............ | G02B 6/0088 |
| 2020/0025353 A1* | 1/2020 | Choi | ............ | F21V 15/01 |

\* cited by examiner

HOUSEHOLD REFRIGERATION APPLIANCE WITH INTERIOR LIGHTING AND METHOD FOR PRODUCING THE HOUSEHOLD REFRIGERATION APPLIANCE

CROSS-REFERENCE TO RELATED APPLICATION

This application claims the priority, under 35 U.S.C. § 119, of German application DE 10 2018 205 757.5, filed Apr. 16, 2018; the prior application is herewith incorporated by reference in its entirety.

BACKGROUND OF THE INVENTION

Field of the Invention

The invention relates to a household refrigeration appliance with interior lighting and a method for producing the household refrigeration appliance.

Household refrigeration appliances normally contain a heat-insulated body with an inner container, which delimits a coolable interior for storing foodstuffs, a refrigeration device for cooling the coolable interior and a heat-insulated door leaf, which, in the closed state, closes the coolable interior and, in the open state, enables access to said coolable interior. Household refrigeration appliances can also comprise interior lighting, which, at least with an open door leaf, at least partially illuminate the coolable interior.

U.S. Pat. No. 7,736,010 B2 discloses rear wall illumination for a refrigeration appliance containing a cover for an air duct arranged on the rear wall with air outlets. Areas recessed toward the coolable interior are provided on the cover. LEDs are located on the side surfaces of the recessed regions and backlight a transparent cover of the exposed region.

Published, non-prosecuted German patent application DE 10 2014 209 141 A1 discloses a household refrigeration appliance with planar interior lighting, which is fixed in a pocket-shaped indentation in the rear wall of the coolable interior. The pocket-shaped indentation can be embodied as a backing part. The interior lighting comprises LEDs and a planar light guide coupled with the LEDs so that the light from the LEDs coupled into the light guide radiates out of one of the surfaces of the light guide in a planar manner. The interior lighting contains a cover for covering the light guide. A 3D-effect film is arranged between the cover and the light guide.

SUMMARY OF THE INVENTION

The object of the present invention is to disclose further planar interior lighting for a household refrigeration appliance.

The object of the invention is achieved by a household refrigeration appliance having a heat-insulated body with an inner container, which delimits a coolable interior provided for storing foodstuffs, a refrigeration device for cooling the coolable interior, a door leaf for closing the coolable interior and interior lighting for the at least partial illumination of the coolable interior. The coolable interior contains two side walls and one rear wall of which the surfaces facing the coolable interior are formed by the inner container and the interior lighting contains an at least semitransparent cover, a planar light guide with a first surface facing the inner container and a second surface facing the cover and at least one lighting device, which couples its light into the planar light guide so that the planar light guide is able to decouple the light from its second surface. The interior lighting contains a carrier plate with which the interior lighting is fixed on the rear wall on the surface facing the coolable interior on the inner container and which contain a frame on which the cover is fixed, and the first surface of the planar light guide rests on the surface of the carrier plate facing away from the inner container so that the planar light guide is clamped between the cover and the carrier plate.

A further aspect of the invention relates to a method for producing the household refrigeration appliance according to the invention containing the following method steps:
a) arranging the planar light guide on the carrier plate so that the first surface of the planar light guide rests on the surface of the carrier plate facing away from the inner container;
b) fixing the cover on the edge of the carrier plate so that the planar light guide is clamped between the cover and the carrier plate; and
c) fixing the interior lighting on the rear wall so that the carrier plate is fixed on the surface facing the coolable interior on the inner container.

Accordingly, the household refrigeration appliance contains the heat-insulated body with the inner container. The heat-insulated body in particular contains an insulating foam as thermal insulation. The coolable interior contains two side walls and the rear wall, wherein the inner container forms the surfaces of the side walls and the rear wall facing the coolable interior.

The household refrigeration appliance contains the door leaf, which, in closed state, closes the coolable interior and, in open state, enables access to said coolable interior. The coolable interior is provided for storing foodstuffs. At least one door rack can be fixed on the surface facing the coolable interior.

The coolable interior is cooled by the refrigeration device. This is preferably embodied as a refrigerant circuit, which is known in principle to the person skilled in the art and is preferably configured such that it cools the coolable interior at least approximately to a prespecified temperature. The household refrigeration appliance can contain an electronic control device which controls or regulates the refrigeration device in the manner known in principle to the person skilled in the art.

The household refrigeration appliance contains the interior lighting, which is provided, at least when the door leaf is open, to illuminate the coolable interior at least partially. To recognize the open condition of the door leaf, the household refrigeration appliance can comprise a suitable door-open recognition device that is known in principle to the person skilled in the art.

The household refrigeration appliance according to the invention can, for example be a household refrigerator. In this case, the coolable interior is cooled to temperatures higher than 0° C. However, the household refrigeration appliance according to the invention can also be a combined fridge freezer. The household refrigeration appliance according to the invention can comprise exactly one coolable interior, but also a plurality of coolable interiors, which can also be closed and opened with one door leaf in each case.

The household refrigeration appliance according to the invention can also be embodied as a wine cooler, which is provided for storing bottles filled with potable liquid, in particular wine. In this case, the door leaf preferably does not comprise any door racks and is preferably at least partially transparent in that it is, for example, at least partially made of glass. In this case, it can be provided that the interior lighting also illuminates the coolable interior when the door leaf is closed.

The interior lighting comprises the planar light guide, which is in particular made of a material transparent to light such as, for example, PMMA (polymethyl methacrylate) or polycarbonate and the cover covering the light guide. The cover is in particular a diffuser. The planar light guide contain two surfaces namely the first surface and the second surface. The second surface faces the cover. The cover preferably rests on the second surface.

The second surface of the planar light guide can be surface textured or provided with a decoupling surface texture. The decoupling surface texture can, for example, comprise a plurality of flutes or notches and/or diffusors, which are introduced into the second surface of the light guide.

The interior lighting comprises the at least one lighting device, which preferably contains one LED or a plurality of LEDs, arranged, for example, adjacent to one another. The LEDs are preferably fixed on a printed circuit board, which is in particular contact-connected to an electric cable in order to supply the LEDs with electric energy.

The at least one lighting device is coupled to the planar light guide such that it is able to couple its light into the light guide.

Preferably, the lighting means is arranged such that it couples its light laterally into the planar light guide.

The light guide is able to decouple, at least partially, the coupled-in light from its second surface so that the light can shine through the cover.

The interior lighting contains the carrier plate, which is preferably made of plastic. The carrier plate comprises the frame on which the cover is fixed. The first surface of the planar light guide rests on the surface of the carrier plate facing away from the inner container so that the planar light guide is clamped between the cover and the carrier plate.

Thus, it is possible, first to produce the interior lighting separately and then to fix it as a whole on the rear wall in the relevant region of the inner container. However, it is also possible, first to fix the carrier plate on the rear wall, then to arrange the light guide in the carrier plate and, after this, to fix the cover on the frame of the carrier plate.

The carrier plate is fixed on the rear wall of the coolable interior on the surface of the inner container facing the coolable interior. To this end, the carrier plate contains, for example, a fixing means molded-on in one piece. The fixing device is preferably a latching device, for example at least one latching hook.

Accordingly, the carrier plate preferably contains at least one latching device and the inner container a counter-latching device with which the latching device for fixing the carrier plate on the surface facing the coolable interior is latched on the inner container. Counter-latching means are for example corresponding openings in the inner container in the region of the rear wall.

The interior lighting or the planar light guide thereof is preferably dimensioned large enough to cover the entire rear wall, or at least large part of the rear wall.

Additionally or alternatively, the carrier plate can be screwed to the rear wall or the corresponding region of the inner container by means of at least one screw. The screw head of this screw can be provided with a cover cap.

Hence, to fix the interior lighting on the rear wall, the method according to the invention can include the latching of the carrier plate to the rear wall by the latching device and the counter-latching device so that the carrier plate is fixed on the surface facing the coolable interior on the inner container.

The interior lighting can contains one first printed circuit board with a plurality of LEDs arranged adjacent to one another as a lighting device. In this case, the carrier plate can comprise a first duct in which the first printed circuit board with its LEDs is arranged. The first duct is in particular arranged on the carrier plate such that the LEDs on the first printed circuit board are able to couple their light into a first side of the light guide, i.e. are able to couple their light laterally into the planar light guide. The first duct preferably extends vertically.

The interior lighting can preferably also comprise a second printed circuit board with a plurality, of LEDs arranged adjacent to one another. In this case, the carrier plate can comprise a second duct in which the second printed circuit board with its LEDs is arranged. The second duct is in particular arranged on the carrier plate such that the LEDs of the second printed circuit board are able to couple their light into a second side of the light guide, i.e. are also able to couple their light laterally into the planar light guide. The second side is opposite the first side.

To install the interior lighting, in particular the first printed circuit board with its LEDs is arranged or fixed in the first duct before the fixing of the cover to the frame and, optionally, the second printed circuit board with its LEDs is arranged or fixed in the second duct before the fixing of the cover to the frame.

The first printed circuit board can be connected to an electric cable for at least indirect contact connection to the LEDs on the first printed circuit board.

The first duct can be delimited at one of its ends by a wall of the carrier plate and open at its other end.

The electric cable can be guided through the open end of the first duct.

The interior lighting can comprise a sealing plug, which closes the open end of the first duct.

The second printed circuit board can be connected to the electric cable for at least indirect contact connection of the LEDs on the second printed circuit board.

The second duct can be delimited at one of its ends by a wall of the carrier plate and open at its other end.

The electric cable can be guided through the open end of the second duct.

The interior lighting can contain a further sealing plug, which closes the open end of the second duct.

The cover preferably contains a semitransparent region through which the light decoupled from the planar light guide is able to pass at least partially and a region surrounding the semitransparent region, which is opaque to light, extends to the edges of the cover and completely overlaps the LEDs on the first printed circuit board, and, optionally, the LEDs on the second printed circuit board.

The region of the cover that is opaque to light is preferably achieved by imprinting, in particular by a white print mask.

The cover is preferably fixed on the frame of the carrier plate by means of an adhesive. The adhesive in particular has waterproof properties.

To improve the fixing of the cover on the frame, the frame can preferably comprise at least one first groove in which the adhesive for fixing the cover on the frame is arranged. The first groove preferably runs around the circumference of the frame.

Thus, to fix the cover on the frame, the adhesive is preferably arranged in the first groove and then the cover is pressed against the frame until the adhesive is cured and thus the cover is fixed on the frame. The frame preferably contains at least one second groove, which is provided to accommodate excess adhesive that is pressed out of the first groove into the second groove during the fixing of the cover on the frame. The second groove preferably runs around the circumference of the frame. The second groove can be smaller than the first groove.

During the fixing of the cover to the frame by the adhesive, the cover is preferably pressed against the frame. As result, it may be the case that adhesive arranged in the first groove cannot be accommodated completely by the first groove and is pressed out of the first groove as excess adhesive. To ensure that this excess adhesive does not flow uncontrolled, the second groove is preferably provided to accommodate this excess adhesive.

Thus, the cover is preferably fixed on the frame of the carrier plate based on the following method steps:
a) arranging an adhesive in the at least first groove;
b) pressing the cover against the frame in order to fix the cover adhesively to the frame for the fixing, wherein the cover is in particular pressed against the frame until the adhesive is completely cured; and
c) accommodation by the second groove of excess adhesive that is pressed out of the first groove into the second groove during the fixing of the cover on the frame.

The household refrigeration appliance according to the invention can comprise at least one shelf provided for the storage of foodstuffs arranged in the coolable interior.

According to one embodiment of the household refrigeration appliance according to the invention, it comprises a holding device fixed on the rear wall for fixing the at least one shelf. Then, in particular the carrier plate, the light guide and the cover in each case comprise a corresponding opening through which the holding device protrudes.

The carrier plate then preferably contains in the region of its opening a raised wall with an edge on which the cover rests. In particular, the cover is fixed to this edge by means of the adhesive and accordingly preferably rests on the edge in that it is adhesively fixed by means of the adhesive.

The household refrigeration appliance according to the invention can comprise an air duct that extends at least partially within the rear wall and is coupled to the refrigeration device, which terminates with a duct opening in the coolable interior. This enables air cooled by the refrigeration device to pass through the air duct and the duct opening into the coolable interior. Preferably, a forced convection device, for example in the form of a ventilator, can be provided to enforce the conveyance of the cooled air into the coolable interior.

The carrier plate, the light guide and the cover then preferably in each case contain a further opening corresponding to the duct opening so that air cooled by the refrigeration device is able to pass through the air duct, its duct opening and the further openings into the coolable interior.

Then, the carrier plate preferably comprises in the region of its further opening a raised wall with an edge on which the cover rests. In particular, the cover is fixed on this edge by means of the adhesive, accordingly preferably rests on this edge in that it is adhesively fixed by means of the adhesive.

Depending upon the embodiment, the interior lighting can result in the illumination of an insertable rear wall and the construction of an illuminated rear wall.

The interior lighting in particular provides an illuminated rear wall for esthetic illumination of the interior region, i.e. of the coolable interior, in a household refrigeration appliance in particular in the form of a freestanding device. Depending upon the embodiment, this illuminated rear wall or interior lighting containing the following components, for example:
a) a carrier plate, preferably made of plastic,
b) a planar light guide in particular in the form of a light guide plate,
c) preferably two boards or printed circuit boards, which are fitted with LEDs and contact-connected to an electric cable or electric lines. The cable or the lines are in particular soldered to the printed circuit boards.

Optionally, a plug connected to the cable.

Preferably adhesive, in particular with water-tight properties.

A cover preferably in the form of a printed diffuser plate with a print mask.

Optionally, two sealing plugs and a cover cap.

Other features which are considered as characteristic for the invention are set forth in the appended claims.

Although the invention is illustrated and described herein as embodied in a household refrigeration appliance with interior lighting and a method for producing the household refrigeration appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
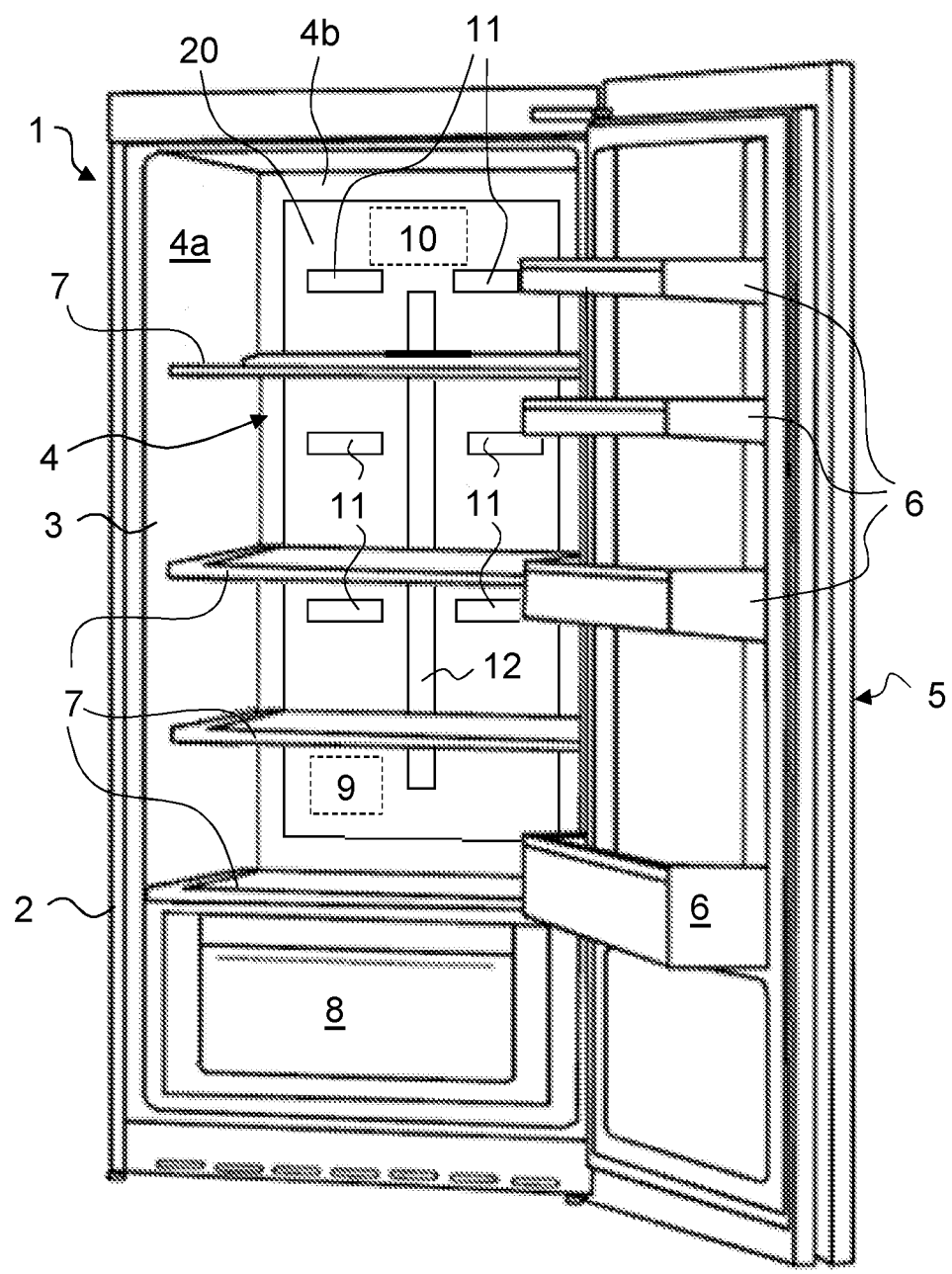
FIG. 1 is a diagrammatic, perspective view of a household refrigeration appliance with interior lighting.

Referring now to the figures of the drawings in detail and first, particularly to FIG. 1 thereof, there is shown a perspective view of a household refrigeration appliance 1 containing a heat-insulated body 2 with an inner container 3 that delimits a coolable interior 4. The coolable interior 4 is provided for storing foodstuffs (not shown). As known in principle to the person skilled in the art, the heat-insulated body 2 contains non-illustrated thermal insulation in the form of insulating foam on which the inner container 3 rests.

The coolable interior 4 contains two side walls 4a and one rear wall 4b of which the surfaces facing the coolable interior 4 are formed by the inner container 3.

The household refrigeration appliance 1 contains a door leaf 5, which is mounted pivotably on the body 2 in particular with respect to a vertically extending axis. When the door leaf 5 is open, the coolable interior 4 is accessible and when the door leaf 5 is closed, the coolable interior 4 is closed.

In the case of the present exemplary embodiment, a plurality of door racks 6 for storing foodstuffs are arranged on the surface of the door leaf 5 oriented in the direction of the coolable interior 4. In particular a plurality of shelves 7 for storing foodstuffs are arranged in the coolable interior 4 and in particular a drawer 8 that can also be used to store foodstuffs is arranged in the lower region of the coolable interior 4. One of the shelves 7 is arranged above the drawer 8 and covers the upward opening of the drawer 8.

In the case of the present exemplary embodiment, the household refrigeration appliance 1 contains a holding device 12 fixed on the rear wall 4b for fixing the shelves 6.

The household refrigeration appliance 1 contains a refrigeration device 9 that is known in principle to the person skilled in the art, preferably in the form of a refrigerant circuit for cooling the coolable interior 4.

In the case of the present exemplary embodiment, the household refrigeration appliance 1 contains an electronic control device 10, which is configured to control the refrigeration device 9, in particular the compressor of the refrigerant circuit in a manner that is generally known to the person skilled in the art such that the coolable interior 4 at least approximately has a prespecified or prespecifiable setpoint temperature. The electronic control device 10 is preferably configured such that it regulates the temperature of the coolable interior 4. In order, optionally, to obtain the actual temperature of the coolable interior 4, the household refrigeration appliance 1 can contain at least one temperature sensor (not shown in further detail), which is connected to the electronic control device 10.

In the case of the present exemplary embodiment, the household refrigeration appliance 1 contains an air duct that extends at least partially within the rear wall 4b and is coupled to the refrigeration device 9 that terminates with a duct opening, in the case of the present exemplary embodiment with six duct openings 11, in the coolable interior 4. This makes it possible for air cooled by the refrigeration device 9 to pass through the air duct and the duct openings 11 into the coolable interior 4. Preferably, a forced convection device (not shown in further detail), for example in the form of a ventilator, can be provided, to enforce the conveyance of the cooled air into the coolable interior 4.

The household refrigeration appliance 1 contains planar interior lighting 20 fixed on the rear wall 4b, which in particular covers the majority of the rear wall 4b. The interior lighting 20 is fixed on the surface of the inner container 3 facing the coolable interior 4.

The interior lighting 20 is provided, at least when the door leaf 5 is open, to illuminate the coolable interior 4 at least partially. To recognize the open condition of the door leaf 5, the household refrigeration appliance 1 can contain a suitable door-open recognition device that is known in principle to the person skilled in the art.

Figure 2:
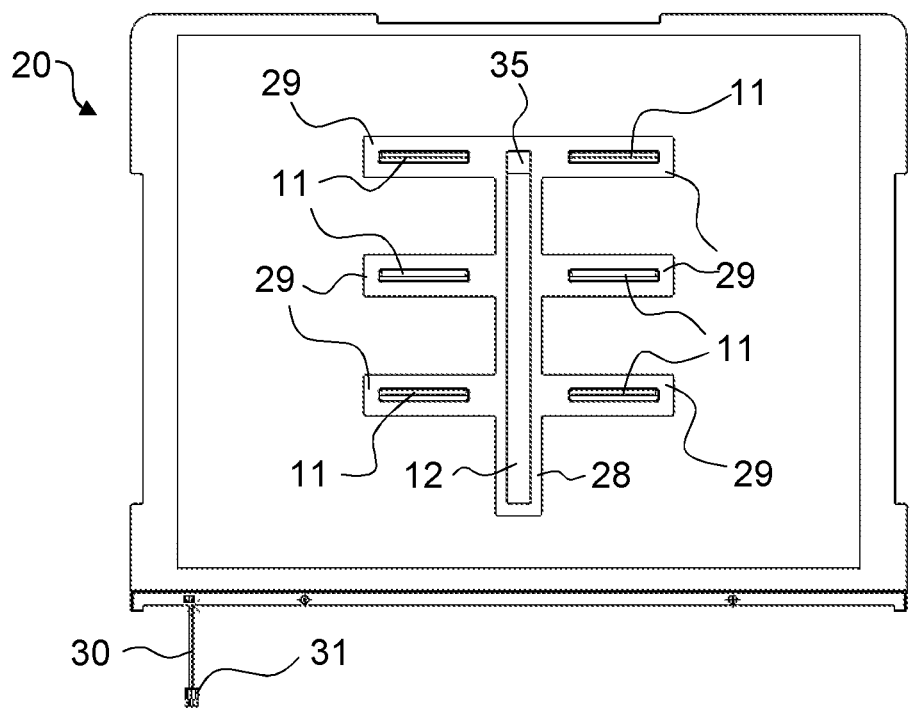
FIG. 2 is a front view of the interior lighting.
Figure 3:
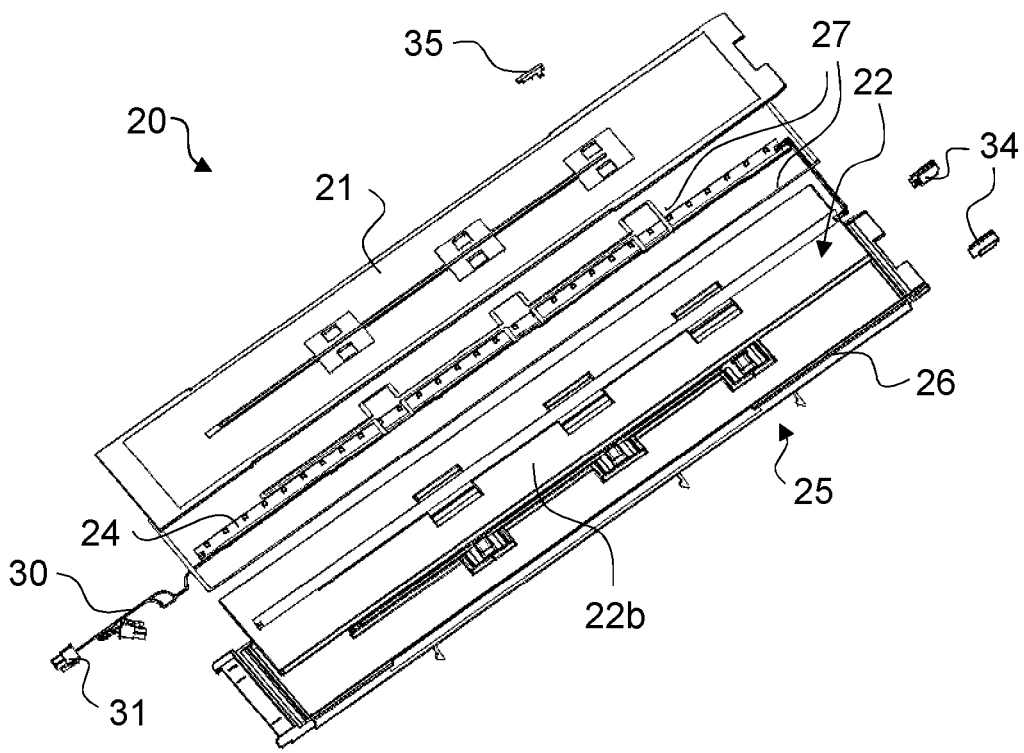
FIG. 3 is an exploded, perspective view of the interior lighting.
Figure 4:
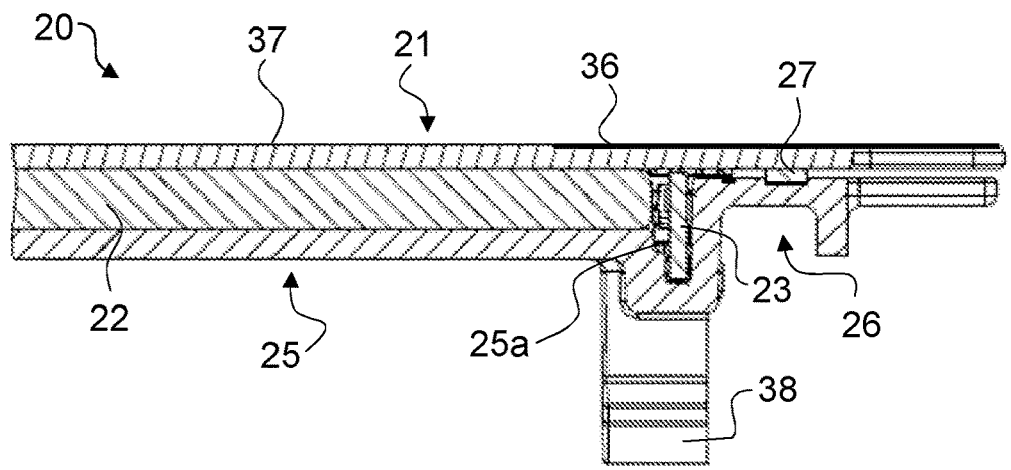
FIG. 4 is a sectional view of a part of the interior lighting.

FIG. 2 is a front view and FIG. 3 is an exploded view of the interior lighting 20. FIG. 4 shows a section of a part of the interior lighting 20.

The interior lighting 20 contains a cover 21 that is at least semitransparent to light and a planar light guide 22 (light guide plate). The planar light guide 22 is in particular made of PMMA (polymethyl methacrylate) or polycarbonate.

Figure 5:
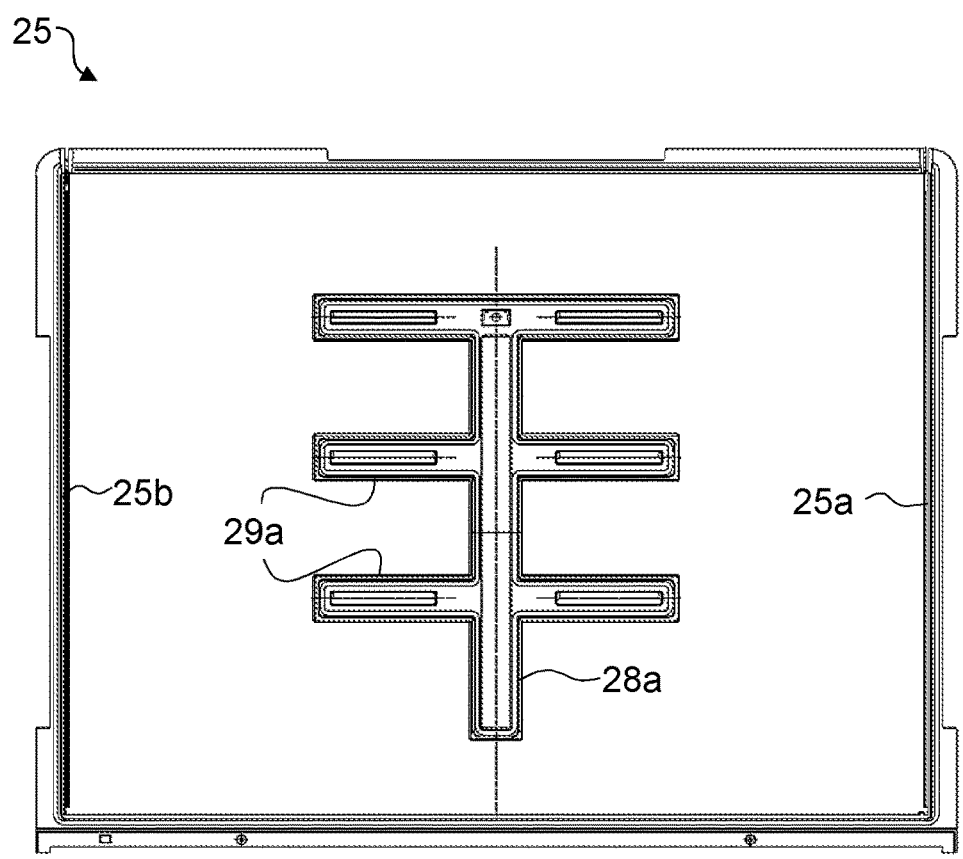
FIGS. 5 and 6 are front views of a carrier plate of the interior lighting.
Figure 6:
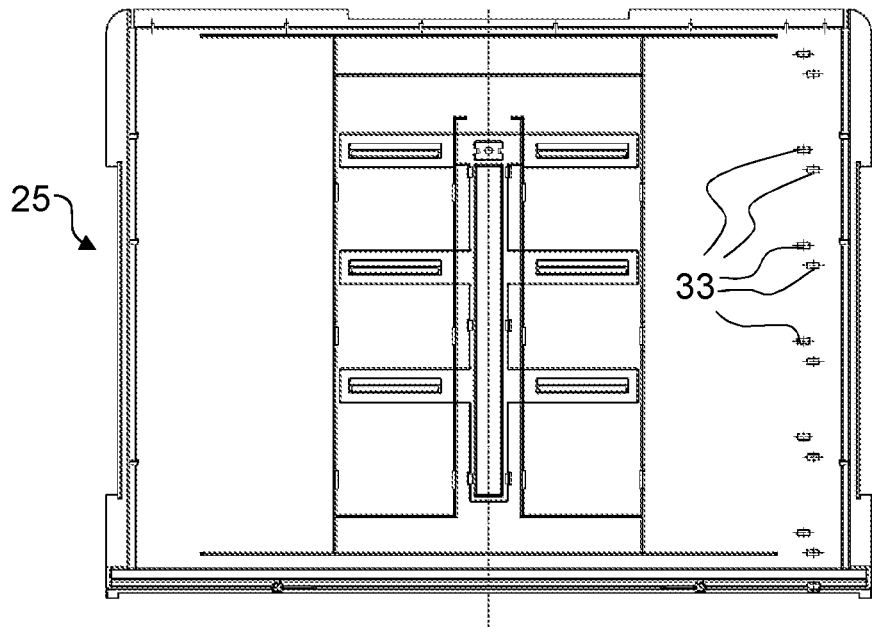
Figure 7:
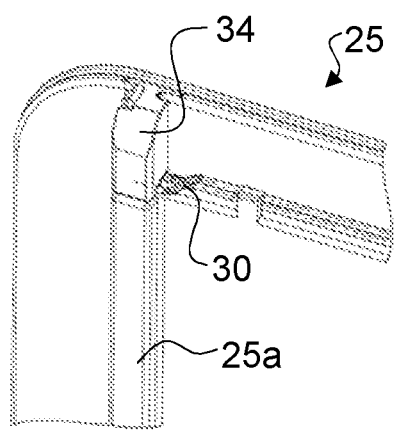
FIGS. 7 and 8 are rear perspective views of a part of the interior lighting.

The interior lighting 20 further contains a carrier plate 25 that is shown in more detail in FIGS. 6 and 7 with which the interior lighting 20 is fixed on the rear wall 4b of the coolable interior 4. FIG. 5 shows the carrier plate 25 with its surface facing away from the rear wall 4b and FIG. 6 shows the carrier plate 25 with its surface facing the rear wall 4b. The carrier plate 25 is in particular a plastic carrier plate.

Figure 8:
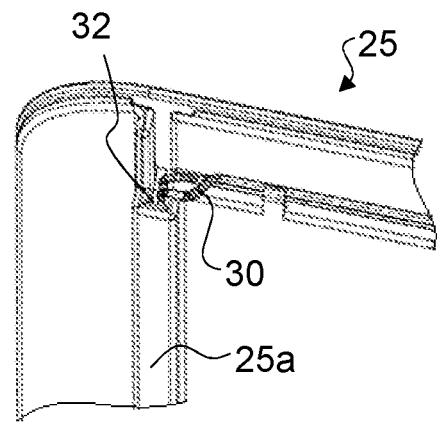
Figure 9:
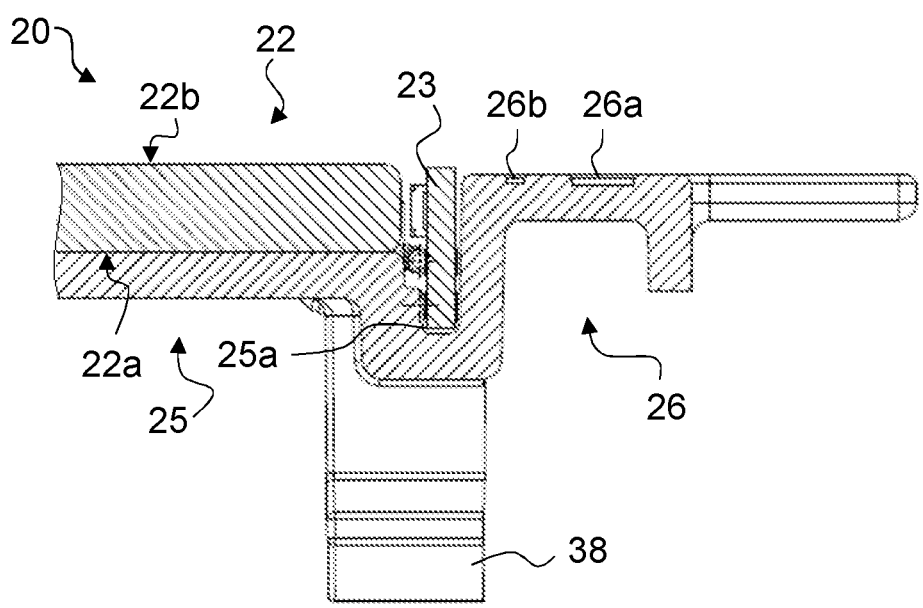
FIG. 9 is a sectional view of a part of the interior lighting with removed cover.

FIGS. 7 and 8 are rear views of a part of the interior lighting 20 and FIG. 9 shows a section of a part of the interior lighting with the cover 21 removed.

The carrier plate 25 has a frame 26 on which the cover 21 is fixed.

The planar light guide 22 has a first surface 22a and a second surface 22b opposite the first surface 22a. The first surface 22a faces the inner container 3 or the rear wall 4b and the second surface 22b of the light guide 22 faces the cover 21.

The interior lighting 20 has at least one lighting device, which couples its light into the planar light guide 22 so that this is able to decouple the light from its second surface 22b.

In the case of the present exemplary embodiment, the lighting device is formed by a first printed circuit board 23 with a plurality of LEDs arranged adjacent to one another and a second printed circuit board 24 with a plurality of LEDs arranged adjacent to one another.

The first surface 22a of the planar light guide 22 rests on the surface of the carrier plate 25 facing away from the inner container 3 so that the planar light guide 22 is clamped between the cover 21 and the carrier plate 25.

In the case of the present exemplary embodiment, the carrier plate 25 has a first duct 25a and a second duct 25b, which are, for example, arranged on the right and left of the carrier plate 25. The first printed circuit board 23 with its LEDs is arranged in the first duct 25a is and the second printed circuit board 24 with its LEDs is arranged in the second duct 25b such that the LEDs are in each case able to couple their light laterally into the planar light guide 22.

The arrangement of the printed circuit boards 23, 24 in the ducts 25a, 25b in particular enables frontal coupling of the light into the planar light guide 22.

The light guide plate or the planar light guide 22 is positioned between the two printed circuit boards 23, 24 or the two ducts 25a, 25b.

In the case of the present exemplary embodiment, the cover 21 is fixed by means of an adhesive 27, in particular with watertight properties, on the frame 26 of the carrier plate 25.

In the case of the present exemplary embodiment, the carrier plate 25, the planar light guide 22 and the cover 21 in each case comprise a corresponding opening 28, through which the holding device 12 for the shelves 6 protrudes.

Moreover, in the case of the present exemplary embodiment, the carrier plate 25 comprises in the region of its opening 28 a raised wall 28a with an edge on which the cover 21 rests, in particular rests in that it is adhesively fixed by means of the adhesive 27.

In the case of the present exemplary embodiment, the carrier plate 25, the light guide 22 and the cover 21 in each case comprise a further opening 29 corresponding to the duct openings 11 so that air cooled by the refrigeration device 9 is able to pass through the air duct, its duct openings 11 and the further openings 29 into the coolable interior 4.

Moreover, in the case of the present exemplary embodiment, the carrier plate 25 has in the region of its further openings 29 a raised wall 29a with an edge on which the cover 21 rests, in particular rests in that it is adhesively fixed by means of the adhesive 27.

The raised wall 28a of the carrier plate 25 in the region of the opening 28 assigned to the holding device 12 in particular represents an elevation on which the cover 21 is centered. The gap between the light guide 22 and the carrier plate 25, the gap between the light guide 22 and the printed circuit boards 23, 24 and the gap between the printed circuit boards 23, 24 and the carrier plate 25 are covered by the cover 21.

In the case of the present exemplary embodiment, the opening 28 and the further openings 29 of the carrier plate are combined to form one single opening so that the corresponding raised walls 28a, 29a run into one another.

In the case of the present exemplary embodiment, the cover 21 for the fixing is adhesively fixed to the frame 26 of the carrier plate 24 by the adhesive 27. The adhesively fixed cover 21 is also used to prevent the planar light guide 22 and the printed circuit boards 23, 24 from falling out of interior lighting 20.

In particular, in the case of the present exemplary embodiment, the frame 26 has a first groove 26a, in which the adhesive 27 is applied. The first groove 26a, which in particular represents an adhesive groove runs around the circumference of the frame 26, i.e. in particular extends around the entire frame 26.

In addition to the first groove 26a, in the case of the present exemplary embodiment, the frame 26 has a second groove 26b. This is preferably smaller than the first groove 26a. The second groove 26b preferably runs around the circumference of the frame 26.

If, for example, too much adhesive 27 is applied in the first groove 26a so that, on the fixing of the cover 21 on the frame 26, excess adhesive 27 is pressed out of the first groove 26a, the second groove 26b is then used to accommodate this excess adhesive. For this reason, it may optionally even be possible to prevent any adhesive 27 reaching the interior region of the rear wall.

Thus, the cover 21 is preferably fixed on the frame 26 of the carrier plate 24 in that the adhesive 27 is arranged in the first groove 26a and the cover 21 is pressed against the frame 26 in order to fix the cover 21 adhesively by adhesive to the frame 26 for the fixing. The cover 21 is preferably pressed against the frame 26 until the adhesive 27 is completely cured. Herein, the second groove 26b accommodates excess adhesive is that is pressed out of the first groove 26a into the second groove 26b during the fixing of the cover 21 on the frame 26.

In the case of the present exemplary embodiment, the LEDs on printed circuit boards 23, 24 are supplied with electric energy via electric lines or an electric cable 30 connected at one end to the printed circuit boards 23, 24 and at the other to a source of electric energy (not shown in further detail) by means of a plug 31.

In the case of the present exemplary embodiment, the ducts 25a, 25b are in each case open at one of their ends, in the case of the present exemplary embodiment at their upper ends, in that the carrier plate 25 has corresponding recesses 32. This is shown in FIG. 8. The electric cable 30 is guided to the printed circuit boards 23, 24 through these recesses 32. In the case of the present exemplary embodiment, the recesses 32 are closed by sealing plugs 34.

In the case of the present exemplary embodiment, the electric cable 30 is guided downward by cable guides 33 on the rear side of the carrier plate 25, i.e. on the surface facing the rear wall 4b of the coolable interior 4. At the lower end, the electric cables 30 are connected to the plug 31.

To fix the interior lighting 20 on the rear wall 4b of the coolable interior 4, in the case of the present exemplary embodiment, the carrier plate 25 has latching hooks 38 molded onto their rear side which are latched with corresponding recesses in the rear wall 4b of the coolable interior 4 or with a ladder system, which is permanently screwed into the household refrigeration appliance 1. In the case of the present exemplary embodiment, the interior lighting 20 is permanently connected to the coolable interior 4 with three screws.

For esthetic reasons, in the case of the present exemplary embodiment, screw heads of visible screws are provided with a cover cap 35 or can be covered by a fixed glass plate.

In the case of the present exemplary embodiment, the planar light guide 22 is made of polymethyl methacrylate (PMMA). The first surface 22a of the planar light guide 22 can have a textured surface or provided with a decoupling surface texture. This surface texture can be lasered into the first surface 22a by means of a laser. As a result of this surface texture, the light is in particular distributed relatively homogeneously from the light-coupling points to the middle of the planar light guide 22.

It is also possible to apply a surface texture on the inner side of the carrier plate 25, i.e. on the surface of the carrier plate 25 facing the light guide 22, for example according to DIN EN ISO 4287:2010 Ra=6.3 to Ra=18.0. The surface texture of the carrier plate 25 enhances the light scattering.

The laser surface texture can result in the formation of black hot spots on the second surface 22b (front side) of the planar light guide 22.

Alternatively, instead of using the material PMMA for the planar light guide 22, it is also possible to use a special material to which light-scattering particles have preferably been added.

To render the so-called black hot spots invisible and optionally achieve a desired white light distribution of the interior lighting 20, in the case of the present exemplary embodiment, the cover 21 comprises a print mask 36. The in particular white print mask 36 ensures that the near field and the individual LED hot spots are not visible.

In particular, the cover 21 has a semitransparent region 37, through which the light decoupled from the planar light guide 22 is able to pass at least partially, and a region surrounding the semitransparent region 37, which is opaque to light, extends to the edges of the cover 21 and completely overlaps the LEDs of the two printed circuit boards 23, 24. The region surrounding the semitransparent region 37 region is in particular embodied as a print mask 36.

The following is a summary list of reference numerals and the corresponding structure used in the above description of the invention:

1 Household refrigeration appliance
2 Heat-insulated body
3 Inner container
4 Coolable interior
4a Side walls
4b Rear wall
5 Door leaf
6 Door rack
7 Shelves
8 Drawer
9 Refrigeration device
10 Electronic control device
11 Duct openings
12 Holding device
20 Interior lighting
21 Cover
22 Light guide
22a First surface
22b Second surface
23 First printed circuit board
24 Second printed circuit board
25 Carrier plate 25a First duct
25b Second duct
26 Frame
26a First groove
26b Second groove
27 Adhesive
28 Opening
28a Raised wall
29 Further openings
29a Raised wall
30 Cable
31 Plug
32 Recesses
33 Cable guides
34 Sealing plug
35 Cover cap
36 Print mask
37 Semitransparent region
38 Latching hook

The invention claimed is:

1. A household refrigeration appliance, comprising:
a heat-insulated body having an inner container, delimiting a coolable interior and provided for storing foodstuffs, said inner container defining said coolable interior having two side walls and one rear wall with surfaces facing said coolable interior;
a refrigeration device for cooling said coolable interior;
a door leaf for closing said coolable interior; and
interior lighting for at least partial illumination of said coolable interior, said interior lighting having an at least semitransparent cover, a planar light guide with a first surface facing said the inner container and a second surface facing said semitransparent cover and at least one lighting device, said lighting device being a printed circuit board with a plurality of LEDs disposed adjacent to one another, said lighting device coupling light thereof into said planar light guide so that said planar light guide is able to decouple the light from said second surface, said interior lighting further having a carrier plate with which said interior lighting is fixed on said rear wall on a surface facing said coolable interior of said inner container, said carrier plate having a frame with a raised edge disposed beyond said printed circuit board in a direction away from said planar light guide, said semitransparent cover is fixed to said raised edge and covers said printed circuit board, and said first surface of said planar light guide rests on a surface of said carrier plate facing away from said inner container so that said planar light guide is clamped between said semitransparent cover and said carrier plate.

2. The household refrigeration appliance according to claim 1,
further comprising an adhesive and said semitransparent cover is fixed on said frame of said carrier plate by means of said adhesive; and
wherein said frame has at least one first groove formed therein in which said adhesive for fixing said semitransparent cover on said frame is disposed.

3. The household refrigeration appliance according to claim 2, wherein said frame has at least one second groove formed therein and provided to accommodate excess of said adhesive, which is pressed out of said first groove into said second groove during the fixing of said cover to said frame.

4. The household refrigeration appliance according to claim 1, further comprising:
at least one shelf for storing of the foodstuffs disposed in said coolable interior; and
a holding device fixed on said rear wall for fixing said at least one shelf, said carrier plate, said planar light guide and said semitransparent cover each have a corresponding opening formed therein through which said holding device protrudes.

5. The household refrigeration appliance according to claim 4, wherein in a region of said corresponding opening of said carrier plate, said carrier plate has a raised wall with a further edge on which said semitransparent cover rests.

6. The household refrigeration appliance according to claim 5, wherein said semitransparent cover is adhesively fixed on said further edge.

7. The household refrigeration appliance according to claim 1,
further comprising an air duct that extends at least partially within said rear wall, and is coupled to said refrigeration device and terminates with a duct opening in said coolable interior; and
wherein said carrier plate, said planar light guide and said semitransparent cover each have a further opening formed therein and corresponding to said duct opening so that air cooled by said refrigeration device is able to pass through said air duct, said duct opening and said further opening into said coolable interior.

8. The household refrigeration appliance according to claim 7, wherein in a region of said further opening of said carrier plate, said carrier plate has a raised wall with a further edge on which said cover rests.

9. The household refrigeration appliance according to claim 8, wherein said semitransparent cover is adhesively fixed on said further edge.

10. The household refrigeration appliance according to claim 1, wherein:
said carrier plate has a first duct in which said printed circuit board with said LEDs is disposed, and said first duct is disposed on said carrier plate such that said LEDs of said first printed circuit board are able to couple the light into a first side of said planar light guide.

11. The household refrigeration appliance according to claim 10,
further comprising an electric cable;
wherein said printed circuit board is connected to said electric cable for at least indirect contact connection to said LEDs of said first printed circuit board;
wherein said carrier plate has a wall;
wherein said first duct is delimited at one of its ends by said wall of said carrier plate and has an open end at its other end, said electric cable is guided through said open end of said first duct; and
wherein said interior lighting has a sealing plug, which closes said open end of said first duct and/or that said cover contains a semitransparent region through which the light decoupled from said planar light guide is able to pass at least partially and a region surrounding said semitransparent region, which is opaque to light, extends to edges of said semitransparent cover and completely overlaps said LEDs of said printed circuit board.

12. The household refrigeration appliance according to claim 1, wherein said carrier plate has a lighting device receiving duct formed therein, said lighting device being disposed in said lighting device receiving duct.

13. The household refrigeration appliance according to claim 12, wherein said lighting device receiving duct is defined by an inner surface terminating at said surface of said carrier plate facing away from said inner container and by an outer surface extending beyond said surface of said carrier plate facing away from said inner container to said frame.

14. A method for producing a household refrigeration appliance, which comprises the following method steps of:
- disposing a planar light guide on a carrier plate of an interior lighting so that a first surface of the planar light guide rests on a surface of the carrier plate facing away from an inner container of a body of the household refrigeration appliance, the inner container defining a coolable interior;
- disposing a printed circuit board, with a plurality of LEDs disposed adjacent to one another, on a side of the planar light guide for coupling light into the planar light guide;
- fixing a semitransparent cover on a raised edge of a frame of the carrier plate, the raised edge disposed beyond the printed circuit board in a direction away from the planar light guide, the semitransparent cover clamping the planar light guide between the cover and the carrier plate and the cover covering the printed circuit board; and
- fixing the interior lighting on a rear wall of the inner container so that the carrier plate is fixed on a surface facing the coolable interior on the inner container.

15. The method according to claim 14, which further comprises:
- providing the frame with at least one first groove and at least one second groove formed therein;
- fixing the cover on the raised edge of the carrier plate by the following method substeps:
  - disposing an adhesive in the first groove;
  - pressing the cover against the frame in order to affix the cover to the frame with the adhesive for the fixing, wherein the cover is pressed against the frame until the adhesive is completely cured; and
  - accommodating in the second groove excess adhesive that is pressed out of the first groove into the second groove during the fixing of the cover on the frame.

* * * * *